(12) United States Patent
Kwon et al.

(10) Patent No.: US 10,437,270 B2
(45) Date of Patent: Oct. 8, 2019

(54) SYSTEMS AND METHODS FOR REPORTING OF EXCESSIVE VIBRATION CONDITIONS IN A STORAGE RESOURCE

(71) Applicant: Dell Products L.P., Round Rock, TX (US)

(72) Inventors: Haesung Kwon, Austin, TX (US); Chandrashekar Nelogal, Round Rock, TX (US); David M. Pereira, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 407 days.

(21) Appl. No.: 15/275,757

(22) Filed: Sep. 26, 2016

(65) Prior Publication Data

US 2018/0088604 A1    Mar. 29, 2018

(51) Int. Cl.
| | |
|---|---|
| *G05D 19/02* | (2006.01) |
| *G11B 25/04* | (2006.01) |
| *G11B 33/08* | (2006.01) |
| *G11B 33/14* | (2006.01) |

(52) U.S. Cl.
CPC ........... *G05D 19/02* (2013.01); *G11B 25/043* (2013.01); *G11B 33/08* (2013.01); *G11B 33/142* (2013.01)

(58) Field of Classification Search
None
See application file for complete search history.

(56) References Cited

U.S. PATENT DOCUMENTS

| | | | |
|---|---|---|---|
| 8,824,088 B2 | 9/2014 | Kwon et al. | |
| 9,036,291 B1 | 5/2015 | Nava et al. | |
| 9,251,859 B2* | 2/2016 | Mundt | G11B 33/08 |
| 2010/0123964 A1* | 5/2010 | Haga | G11B 19/042 |
| | | | 360/31 |
| 2013/0317657 A1* | 11/2013 | Mundt | G05B 5/01 |
| | | | 700/280 |

* cited by examiner

*Primary Examiner* — Sean Shectman
(74) *Attorney, Agent, or Firm* — Jackson Walker L.L.P.

(57) ABSTRACT

In accordance with embodiments of the present disclosure, an information handling system may include a processor and a storage resource communicatively coupled to the processor. The storage resource may be configured to monitor one or more operating parameters of the storage resource indicative of vibration external to the storage resource affecting performance of the storage resource, determine whether the one or more operating parameters exceed respective threshold values, and in response to determining that the one or more operating parameters exceed a respective threshold value, communicate an indication from the storage resource to a subsystem of the information handling system that the storage resource is experiencing excessive vibration from sources external to the storage resource.

20 Claims, 2 Drawing Sheets

SYSTEMS AND METHODS FOR REPORTING OF EXCESSIVE VIBRATION CONDITIONS IN A STORAGE RESOURCE

TECHNICAL FIELD

The present disclosure relates in general to information handling systems, and more particularly to reporting of excessive vibration conditions of a storage resource of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, servers and storage systems, may include storage resources, also known as hard disk drives. Oftentimes, storage resources may be affected by mechanical vibrations occurring external to such storage resources, including air movers (e.g., cooling fans or blowers) or other mechanical devices that cause vibration of storage resources and their components. Because such vibration can cause undesirable side effects, such as reduced read/write throughput and inoperability, it may be desirable to provide for a mechanism for reporting the presence of such vibration in order to control vibration-inducing components to minimize or eliminate such vibration.

SUMMARY

In accordance with the teachings of the present disclosure, the disadvantages and problems associated with component vibration in an information handling system may be reduced or eliminated.

In accordance with embodiments of the present disclosure, an information handling system may include a processor and a storage resource communicatively coupled to the processor. The storage resource may be configured to monitor one or more operating parameters of the storage resource indicative of vibration external to the storage resource affecting performance of the storage resource, determine whether the one or more operating parameters exceed respective threshold values, and in response to determining that the one or more operating parameters exceed a respective threshold value, communicate an indication from the storage resource to a subsystem of the information handling system that the storage resource is experiencing excessive vibration from sources external to the storage resource.

In accordance with these and other embodiments of the present disclosure, a method may include monitoring one or more operating parameters of a storage resource indicative of vibration external to the storage resource affecting performance of the storage resource, determining whether the one or more operating parameters exceed respective threshold values, and in response to determining that the one or more operating parameters exceed a respective threshold value, communicating an indication from the storage resource to a subsystem of an information handling system in which the storage resource is disposed that the storage resource is experiencing excessive vibration from sources external to the storage resource.

In accordance with these and other embodiments of the present disclosure, a storage resource may include storage media for storage of data and control circuitry configured to monitor one or more operating parameters of the storage resource indicative of vibration external to the storage resource affecting performance of the storage resource, determine whether the one or more operating parameters exceed respective threshold values, and in response to determining that the one or more operating parameters exceed a respective threshold value, communicate an indication from the storage resource to a subsystem of an information handling system comprising the storage resource that the storage resource is experiencing excessive vibration from sources external to the storage resource.

In accordance with these and other embodiments of the present disclosure, an article of manufacture may include a non-transitory computer readable medium and computer-executable instructions carried on the computer readable medium. The instructions may be readable by a processor, the instructions, when read and executed, for causing the processor to monitor one or more operating parameters of a storage resource indicative of vibration external to the storage resource affecting performance of the storage resource, determine whether the one or more operating parameters exceed respective threshold values, and in response to determining that the one or more operating parameters exceed a respective threshold value, communicate an indication from the storage resource to a subsystem of an information handling system comprising the storage resource that the storage resource is experiencing excessive vibration from sources external to the storage resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
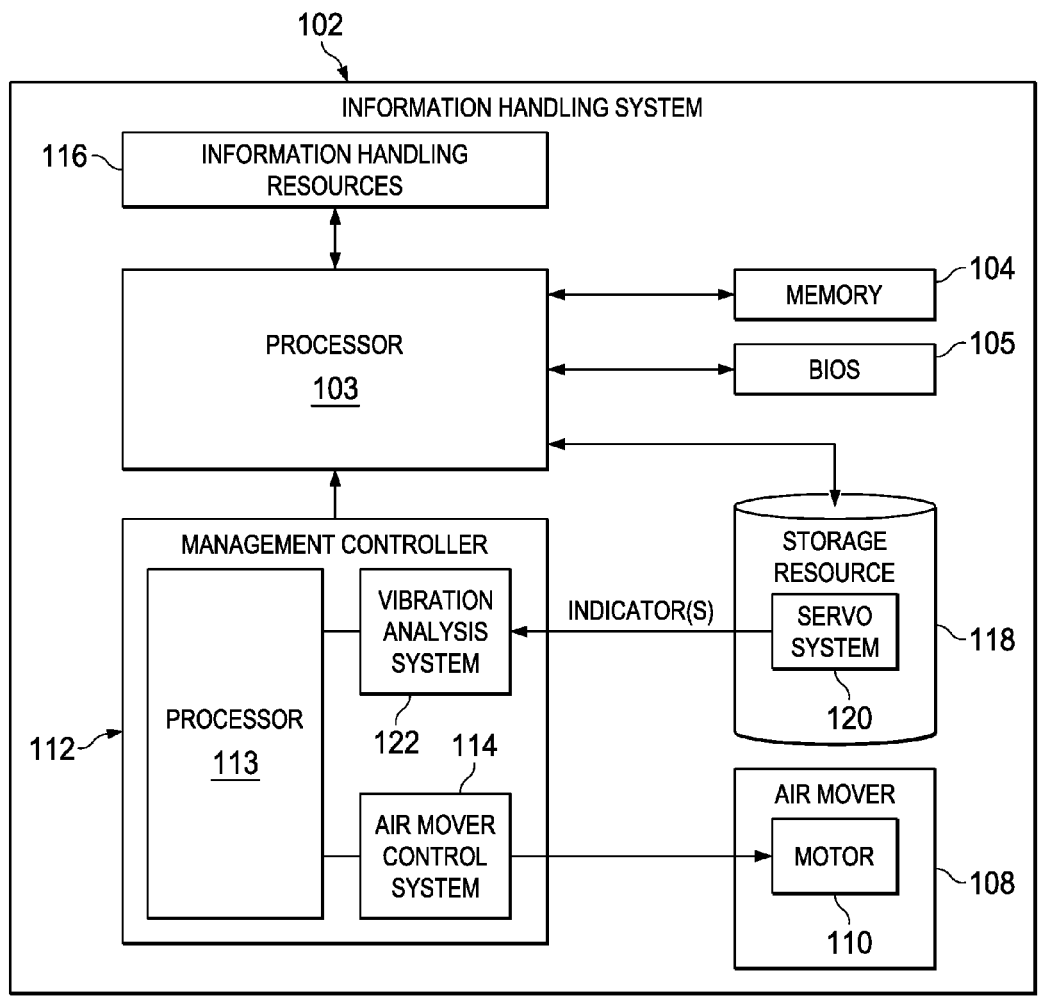
FIG. 1 illustrates a block diagram of selected components of an example information handling system, in accordance with embodiments of the present disclosure.
Figure 2:
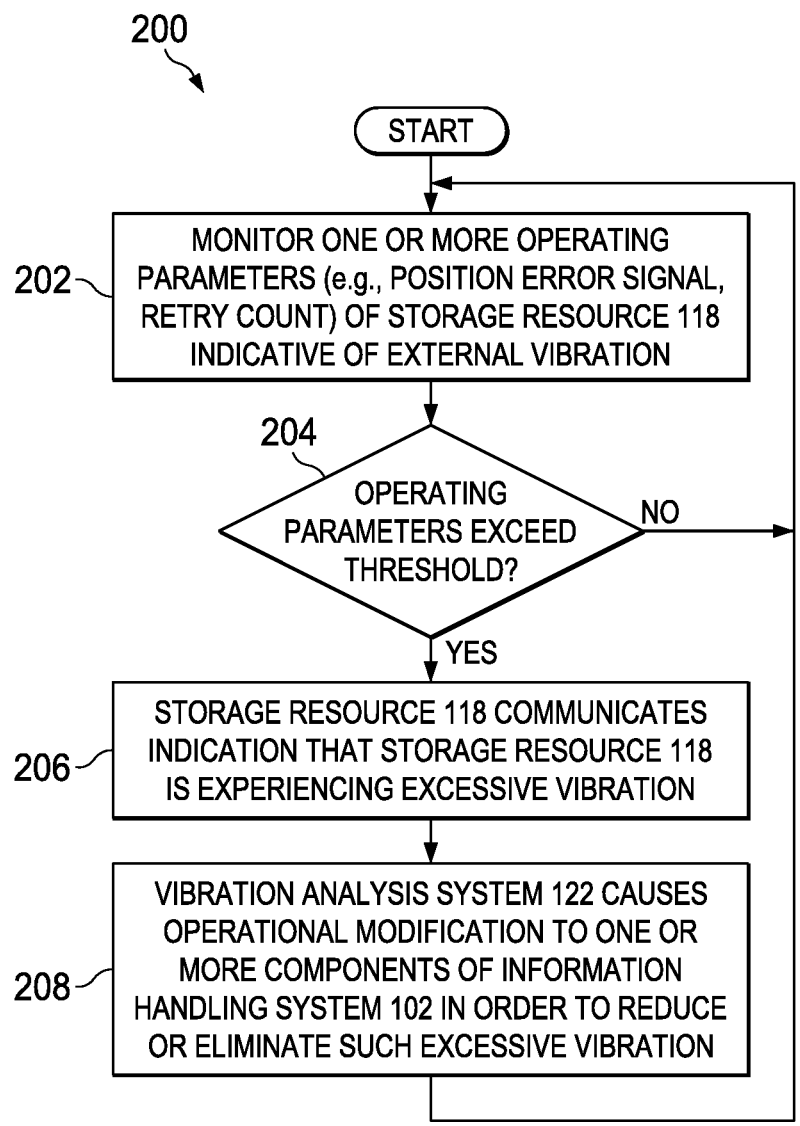
FIG. 2 illustrates a flow chart of an example method for reporting of excessive vibration conditions in a storage resource and responding thereto, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages, electro-mechanical devices (e.g., air movers), displays, and power supplies.

FIG. 1 illustrates a block diagram of selected components of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of hard disk drives and/or other computer-readable media for storing data. As shown in FIG. 1, information handling system 102 may comprise a processor 103, a memory 104, a basic input/output system (BIOS) 105, an air mover 108, a management controller 112, a storage resource 118, and one or more other information handling resources 116.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 118, and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. In some embodiments, BIOS 105 may also be configured to store and/or report configuration information regarding a hardware configuration (e.g., population of various information handling resources) of information handling system 102.

Air mover 108 may include any mechanical or electro-mechanical system, apparatus, or device operable to move air and/or other gases in order to cool information handling resources of information handling system 102. In some embodiments, an air mover 108 may comprise a fan (e.g., a rotating arrangement of vanes or blades which act on the air). In other embodiments, air mover 108 may comprise a blower (e.g., centrifugal fan that employs rotating impellers to accelerate air received at its intake and change the direction of the airflow). In these and other embodiments, rotating and other moving components of an air mover 108 may be driven by a motor 110. The rotational speed of a motor 110 may be controlled by an air mover control signal (e.g., a pulse-width modulation signal) communicated from a corresponding air mover control system 114 of management controller 112. In operation, an air mover 108 may cool information handling resources of information handling system 102 by drawing cool air into an enclosure housing the information handling resources from outside the enclosure, expel warm air from inside the enclosure to the outside of such enclosure, and/or move air across one or more heat sinks (not explicitly shown) internal to the enclosure to cool one or more information handling resources.

Management controller 112 may comprise any system, device, or apparatus configured to facilitate management and/or control of information handling system 102 and/or one or more of its component information handling resources. Management controller 112 may be configured to issue commands and/or other signals to manage and/or control information handling system 102 and/or its information handling resources. Management controller 112 may comprise a microprocessor, microcontroller, DSP, ASIC, field programmable gate array ("FPGA"), EEPROM, or any combination thereof. Management controller 112 also may be configured to provide out-of-band management facilities for management of information handling system 102. Such management may be made by management controller 112 even if information handling system 102 is powered off or powered to a standby state. In certain embodiments, management controller 112 may include or may be an integral part of a baseboard management controller (BMC), a remote access controller (e.g., a Dell Remote Access Controller or Integrated Dell Remote Access Controller), an enclosure controller, or a storage enclosure processor (SEP). In other embodiments, management controller 112 may include or may be an integral part of a chassis management controller (CMC).

As shown in FIG. 1, management controller 112 may include a processor 113, an air mover control system 114, and a vibration analysis system 122. Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 104 and/or another component of information handling system 102 or management controller 112.

Air mover control system 114 may include any system, device, or apparatus configured to, based on information communicated from processor 113 (e.g., information regarding a hardware configuration of information handling system 102) and/or thermal conditions present in information handling system 102 (e.g., one or more sensed temperatures), calculate an air mover driving signal (e.g., a pulse-width modulation signal) to maintain an appropriate level of cooling, increase cooling, or decrease cooling, as appropriate, and communicate such air mover driving signal to a corresponding air mover 108. In some embodiments, air mover control system 114 may include a program of instructions (e.g., software, firmware) configured to, when executed by a processor (e.g., processor 113) or controller integral to management controller 112, carry out the functionality of air mover control system 114.

Vibration analysis system 122 may include any system, device, or apparatus configured to, based on information communicated from servo system 120 or another component of storage resource 118, analyze such information to determine whether or not to take action (e.g., modify air mover motor speed, control operation of another vibration-inducing information handling resource, etc.) to reduce mechanical vibration affecting storage resource 118, as described in greater detail below. In some embodiments, vibration analysis system 122 may include a program of instructions (e.g., software, firmware) configured to, when executed by a processor (e.g., processor 113) or controller integral to management controller 112, carry out the functionality of vibration analysis system 122.

Storage resource 118 may include a system, device, or apparatus configured to store data. Storage resource 118 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data.

In particular embodiments, storage resource 118 may comprise a magnetic hard disk drive. Accordingly, storage resource 118 may be configured to write and read information that is written in the form of magnetic flux transitions laid out in concentric tracks on the surface of magnetic media. The flux transitions may be created by a write element and detected with a read element, both of which are embedded in a head mounted in a motor-driven mechanical assembly that is used to position the head over a desired track. Successful reading and writing of data requires that the head follow the desired track accurately as the disk is spinning at as fast as thousands of revolutions per minute. As shown in FIG. 1, storage resource 118 may include a closed loop servo system 120 to control the head and keep the head positioned within an acceptable tolerance of its ideal position with respect to the track. When reading information, if the head moves away from the ideal tracking position, a signal-to-noise ratio decreases and the error rate of the read information increases. When writing, information written when the head is not tracking properly will result in writing data that is not centered with respect to the servo tracking information, making it more difficult to read back if servo system 120 keeps the head on-track for read operations.

Servo system 120 may be configured to account for media eccentricity, non-repeatable run-out conditions, and other electro-mechanical disturbances from within storage resource 120, as well as some degree of external influences—particularly sources of mechanical vibration of air mover 108, other storage resources mounted in the same system enclosure, or other information handling resources 116. Servo system 120 may have limitations, and at some point the frequency and/or magnitude of external vibration sources may cause the head to track poorly. The effect of this as seen from an operating system executing on processor 103 may be decreased input/output (I/O) throughput, increased command completion latency, or other undesirable problems because the increased error rate may cause storage resource 118 to re-read information for which a tracking-induced error rate is too high to properly decode.

As described below, servo system 120 and/or other components of storage resource 118 may have or may execute one or more internal monitoring mechanisms that may detect adverse impacts of external vibration conditions. In accordance with this disclosure, such internally monitored information may be communicated from storage resource 118 to vibration analysis system 122 or another component of information handling system 102, and vibration analysis system 122 or such other component may, based on such information, control information handling resources of information handling system 102 that contribute to excessive vibration of storage resource 118.

For example, servo system 120 may monitor a "position error signal" indicative of a difference between a desired location and an actual position of a head of storage resource 118. In some situation, such position error signal may indicate an extent of disturbance induced by mechanical vibrations arising externally to storage resource 118. In addition, frequency components of the position error signal may provide information regarding a frequency of external vibration sources that may be affecting head-tracking accuracy of storage resource 118. Thus, using magnitude and frequency information of the position error signal, storage resource 118 may communicate an indication (e.g., to vibration analysis system 122 or another component of information handling system 102) that a threshold of poor tracking is being approached or has been exceeded. In response to such indication, vibration analysis system 122 or another component of information handling system 102 may reduce vibration of the offending components (e.g., reduce vibration from air mover 108 by communicating a request to air mover control system 114 to modify a speed of motor 110).

Because each model of storage resource 118 may have different designs and such designs vary in their sensitivity to disturbance by certain vibration frequencies and amplitudes, during the design and development of a storage resource 118, model measurements may be taken of the storage resource's sensitivity to externally imposed vibration, and such measurements may be used to set up a table or other data structure of threshold conditions (e.g., frequency and amplitude of position error signal) that the storage resource may use as a condition for communicating an indication to vibration analysis system 122 of the presence of excessive vibration. The reported values may be normalized values such that vibration analysis system 122 or another control system external to storage resource may use a common solution across different storage resource models and designs.

In addition to or in lieu of using a position error signal to indicate excessive vibration, storage resource 118 may also use a settling time to determine a level of external vibration affecting storage resource 118. Settling time of a storage resource 118 may comprise a period of time that a head takes to settle into a normal tracking position range after seeking to a new track. External vibration can lengthen settling time, and excessive settling time can cause a retry of a seek operation or may cause storage resource 118 to wait for another revolution of storage media before the head arrives at the proper location on the track. Since random I/O workload performance is sensitive to missed seeks, reporting when settling time approaches or exceeds an appropriately chosen boundary level may allow vibration analysis system 122 to take pre-emptive or corrective action.

In these and other embodiments, storage resource 118 may use a retry count to determine a level of external vibration affecting storage resource 118. Retry count of a storage resource 118 may comprise the number of retries needed to retrieve requested I/O information from storage resource 118 by a host system executing on processor 103. An excessive amount of retries may be an indicator of poor tracking or poor seeking or both. Because retries are typically handled automatically by storage resource 118 when needed and are not reported to the host system, storage resource 118 may count a number of retries needed to successfully read the required information from storage resource 118, and report to vibration analysis system 122 when the count (or rate) exceeds a threshold specific to storage resource 118. In some embodiments, storage resource 118 may discriminate between retries due to head/ media readability issues and retries due to excessive vibration by not counting retries during times when the position error signal of storage resource 118 is below a threshold value specific to storage resource 118.

Any suitable communication technique may be used to communicate from storage resource 118 to vibration analysis system 122 an indication of external vibration affecting storage resource 118. For example, existing techniques (e.g., mode pages, log pages, SET FEATURES command, etc.) may be used to configure the methods, limits, and operating modes of the vibration detection schemes set forth herein and to report current vibration conditions or "limits exceeded" conditions.

In addition to processor 103, memory 104, BIOS 105, air mover 108, management controller 112, and storage resource 118, information handling system 102 may include one or more other information handling resources 116. Such one or more other information handling resources 116 may include any component system, device or apparatus of an information handling system, including without limitation, a processor, bus, memory, I/O device and/or interface, storage resource (e.g., hard disk drives), network interface, electromechanical device (e.g., fan), display, power supply, and/or any portion thereof. An information handling resource may comprise any suitable package or form factor, including without limitation an integrated circuit package or a printed circuit board having mounted thereon one or more integrated circuits.

Although for the purposes of clarity and exposition, only one each of processor 103, memory 104, BIOS 105, air mover 108, management controller 112, and air mover control system 114 are shown, information handling system 102 may include any suitable number of such components. In addition, in some embodiments, components shown as integral to a particular component may be separate or independent from such particular component. For example, in some embodiments, vibration analysis system 122 may not be integral to management controller 112, and may instead be embodied in software executable on processor 103.

FIG. 2 illustrates a flow chart of an example method 200 for reporting of excessive vibration conditions in a storage resource and responding thereto, in accordance with embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, storage resource 118 may monitor one or more operating parameters (e.g., position error signal, settling time, retry count) of storage resource 118. At step 204, storage resource 118 may compare such one or more operating parameters to thresholds specific to storage resource 118. If any of such thresholds are exceeded, method 200 may proceed to step 206. Otherwise, method 200 may proceed again to step 202.

At step 206, storage resource 118 may communicate an indication to vibration analysis system 122 that storage resource 118 is experiencing excessive vibration caused by components of information handling system 102 external to storage resource 118. Such indication may be communicated in an in-band or out-of-band manner, and may be communicated synchronously or asynchronously.

At step 208, in response to receipt of such indication, vibration analysis system 122 may cause operational modification to one or more components of information handling system 102 (e.g., a change in speed of motor 110 of air mover 108) in order to reduce or eliminate such excessive vibration. After completion of step 208, method 200 may return to step 202.

Although FIG. 2 discloses a particular number of steps to be taken with respect to method 200, method 200 may be executed with more or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor; and
a storage resource communicatively coupled to the processor and configured to:
monitor one or more operating parameters of the storage resource indicative of vibration external to the storage resource affecting performance of the storage resource, wherein the monitoring includes maintaining a count of a number of retries needed to successfully service at least one read request received by the storage resource;
determine whether the one or more operating parameters exceed respective threshold values, wherein the respective threshold values are normalized values that are based on measurements of different types of storage resources, the normalized values being indicative of sensitivities of the different types of storage resources to vibrations at particular frequencies; and
in response to determining that the one or more operating parameters exceed a respective threshold value, communicate an indication from the storage resource to a subsystem of the information handling system that the storage resource is experiencing excessive vibration from sources external to the storage resource, wherein the communicating includes transmitting an indication of the count of the number of retries.

2. The information handling system of claim 1, wherein the one or more operating parameters of the storage resource further comprises at least one of a position error signal and a settling time.

3. The information handling system of claim 1, wherein the subsystem comprises a management controller coupled to the processor for out-of-band management of the information handling system.

4. The information handling system of claim 1, wherein in response to receipt of the indication, the subsystem is configured to cause an operational modification of one or more components of the information handling system in order to reduce the excessive vibration.

5. The information handling system of claim 4, wherein the operational modification comprises a modification of a speed of a motor of an air mover of the information handling system for cooling components of the information handling system.

6. A method comprising:
monitoring one or more operating parameters of a storage resource indicative of vibration external to the storage resource affecting performance of the storage resource, wherein the monitoring includes maintaining a count of a number of retries needed to successfully service at least one read request received by the storage resource;
determining whether the one or more operating parameters exceed respective threshold values, wherein the respective threshold values are normalized values that are based on measurements of different types of storage resources, the normalized values being indicative of sensitivities of the different types of storage resources to vibrations at particular frequencies; and
in response to determining that the one or more operating parameters exceed a respective threshold value, communicating an indication from the storage resource to a subsystem of an information handling system in which the storage resource is disposed that the storage resource is experiencing excessive vibration from sources external to the storage resource, wherein the communicating includes transmitting an indication of the count of the number of retries.

7. The method of claim 6, wherein the one or more operating parameters of the storage resource further comprises at least one of a position error signal and a settling time.

8. The method of claim 6, wherein the subsystem comprises a management controller configured to provide out-of-band management of the information handling system.

9. The method of claim 6, further comprising, in response to receipt of the indication, causing by the subsystem an operational modification of one or more components of the information handling system in order to reduce the excessive vibration.

10. The method of claim 9, wherein the operational modification comprises a modification of a speed of a motor of an air mover of the information handling system for cooling components of the information handling system.

11. A storage resource comprising:
storage media for storage of data; and
control circuitry configured to:
monitor one or more operating parameters of the storage resource indicative of vibration external to the storage resource affecting performance of the storage resource, wherein the monitoring includes maintaining a count of a number of retries needed to successfully service at least one read request received by the storage resource;
determine whether the one or more operating parameters exceed respective threshold values, wherein the respective threshold values are normalized values that are based on measurements of different types of storage resources, the normalized values being indicative of sensitivities of the different types of storage resources to vibrations at particular frequencies; and
in response to determining that the one or more operating parameters exceed a respective threshold value, communicate an indication from the storage resource to a subsystem of an information handling system comprising the storage resource that the storage resource is experiencing excessive vibration from sources external to the storage resource, wherein the communicating includes transmitting an indication of the count of the number of retries.

12. The storage resource of claim 11, wherein the one or more operating parameters of the storage resource further comprises at least one of a position error signal and a settling time.

13. The storage resource of claim 11, wherein the subsystem comprises a management controller configured to provide out-of-band management of the information handling system.

14. The storage resource of claim 11, wherein in response to receipt of the indication, the subsystem is configured to cause an operational modification of one or more components of the information handling system in order to reduce the excessive vibration.

15. The storage resource of claim 14, wherein the operational modification comprises a modification of a speed of a motor of an air mover of the information handling system for cooling components of the information handling system.

16. An article of manufacture comprising:
a non-transitory computer readable medium; and
computer-executable instructions carried on the computer readable medium, the instructions readable by a processor, the instructions, when read and executed, for causing the processor to:
monitor one or more operating parameters of a storage resource indicative of vibration external to the storage resource affecting performance of the storage resource, wherein the monitoring includes maintaining a count of a number of retries needed to successfully service at least one read request received by the storage resource;
determine whether the one or more operating parameters exceed respective threshold values, wherein the respective threshold values are normalized values that are based on measurements of different types of storage resources, the normalized values being indicative of sensitivities of the different types of storage resources to vibrations at particular frequencies; and
in response to determining that the one or more operating parameters exceed a respective threshold value, communicate an indication from the storage resource to a subsystem of an information handling system comprising the storage resource that the storage resource is experiencing excessive vibration from sources external to the storage resource, wherein the communicating includes transmitting an indication of the count of the number of retries.

17. The storage resource of claim 16, wherein the one or more operating parameters of the storage resource further comprises at least one of a position error signal and a settling time.

18. The storage resource of claim 16, wherein the subsystem comprises a management controller coupled to the processor for out-of-band management of the information handling system.

19. The storage resource of claim 16, wherein in response to receipt of the indication, the subsystem is configured to cause an operational modification of one or more components of the information handling system in order to reduce the excessive vibration.

20. The storage resource of claim 19, wherein the operational modification comprises a modification of a speed of a motor of an air mover of the information handling system for cooling components of the information handling system.

* * * * *